Patented Apr. 1, 1941

2,237,032

UNITED STATES PATENT OFFICE 2,237,032

PROCESS OF INCREASING THE SOUND ABSORPTIVE PROPERTIES OF CELLULAR GLASS

Elmer H. Haux, Tarentum, Pa., assignor to Pittsburgh Plate Glass Company, Allegheny County, Pa., a corporation of Pennsylvania No Drawing. Application February 19, 1938, Serial No. 191,565

2 Claims. (Cl. 49—89)

The present invention relates to insulating materials and more particularly to a process of treating cellular glass in order to increase its efficiency as a sound absorbent.

The primary object of this invention is the provision of a process of increasing the permeability of all types of cellular glass whereby their value as sound absorbers or deadeners will be greatly enhanced.

Other objects and advantages of my invention will become more apparent from the following detailed description of certain preferred embodiments thereof.

Cellular glass is of comparatively recent development but, because of its many desirable properties, its use is spreading rapidly throughout the building industry. It is of low apparent density, providing a light weight material. It is fire resistant and vermin proof, insuring longevity. It possesses a high thermal insulating value, which, coupled with its low apparent density, permits the attainment of greater insulating efficient per unit weight than has heretofore been obtainable.

One method of producing cellular glass is set forth in my co-pending application, Serial No. 171,911, filed October 30, 1937. Therein the process comprises heating together a mixture of ground glass and a gassing agent to a temperature sufficient to sinter the particles of glass and subsequently to decompose the gassing agent with the formation of cells dispersed throughout the body of glass. Other methods of production are known, however, and may be employed to manufacture cellular glass which is to be treated in accordance with the provisions of the present invention.

Generally, the cellular glass now available comprises about 10 per cent of glass and 90 per cent of voids dispersed throughout the vitreous material as tiny, individual compartments or cells. Such structure is a necessary incident to the methods of manufacture and, in fact, the various processes have been developed to produce material of this type.

It will at once be obvious, therefore, that cellular glass while possessing excellent thermal insulating properties is not suitable as an acoustical material. Naturally the cellular structure prevents a ready transmission of sound through the material just as it prevents the transmission of heat, but the waves of sound impinging against the faces of the cellular glass are reflected rather than absorbed. Accordingly sounds created in a room protected by cellular glass are not deadened, but reverberate. This reverberation may be limited somewhat by stripping the outer surface from the cellular glass to expose a portion of the cells, but even so there is still little or no sound absorption.

It is desirable, therefore, to provide channels connecting the individual cells in order that the sound waves may enter the main body and be absorbed therein. I have found that this objective may be gained by causing the walls surrounding the cells to fracture while retaining the cellular glass substantially in its regular shape and form.

More specifically, the invention comprises cooling the cellular structure rapidly from a temperature of about 300 degrees F. to room temperature or lower. The rapid contraction of the glass produces internal ruptures or fractures of the cell walls. This treatment does not occasion a disintegration or division of the structure but merely provides channels connecting the individual cells contained therein.

Since glass usually requires annealing to obtain the greatest degree of strength and the cellular glass after being formed is annealed, the latent heat of the material may be utilized. In this way, the cellular glass is removed from the annealing leer after its temperature has been reduced to approximately 350 degrees F. and is then cooled rapidly. The cooling may be effected by subjecting the material to blasts of cold air or placing it in a zone of comparatively low temperature, such as an ice chest. It has been found, however, that in many instances the gradient between the leer and room temperatures is sufficient to produce the necessary rapid cooling.

Where the cellular glass is already at room temperature, it must be reheated in an oven or kiln. Such process requires relatively long exposure to heat in order that the cellular material will be at a uniform temperature throughout. The oven is preferably maintained at a temperature of approximately 350 degrees F. to avoid too great a degree of heating. Manifestly, therefore, it is more desirable to conduct the cooling operation as the glass is removed from the annealing leer, for such procedure is not only cheaper but is more satisfactory in the results obtained.

Quantitative tests have proven that the air permeability of cellular glass is increased over 600 per cent as the result of this inner fracturing induced by rapid cooling of the heated glass. The heating and cooling may be repeated several times if it is desired to obtain a greater degree of air permeability and the attendant increase in sound absorption.

A slab of cellular glass treated in accordance with the provisions of my invention may be handled and installed as readily as an untreated unit. It is probable that the thermal insulating value of the cellular glass is lowered slightly by this treatment but the improvement in sound absorptive properties more than offsets this loss and makes the treated material far more valuable for many purposes. It is to be understood that the foregoing described process is susceptible of various modifications without occasioning a departure from the spirit of my invention or the scope of the appended claims.

What I claim is:

1. A process of increasing the sound absorptive properties of cellular glass which comprises heating the cellular glass to approximately 300 degrees F. and then cooling it rapidly to fracture a large percentage of the walls surrounding the individual compartments contained in the cellular structure to provide communicating channels between the cells.

2. A process of increasing the sound absorptive properties of cellular glass which comprises removing the cellular glass from the annealing leer through which it passes during manufacture at a point where the glass is at a temperature of approximately 300 degrees F. and then cooling the glass rapidly to below room temperature to fracture a large percentage of the walls surrounding the individual compartments contained in the cellular structure to provide communicating channels between the cells.

ELMER H. HAUX.